US010621886B2

(12) United States Patent
Kim et al.

(10) Patent No.: US 10,621,886 B2
(45) Date of Patent: Apr. 14, 2020

(54) APPARATUS AND METHOD FOR CYBER-CRISIS RESPONSE TRAINING BASED ON AUGMENTED REALITY

(71) Applicant: ELECTRONICS AND TELECOMMUNICATIONS RESEARCH INSTITUTE, Daejeon (KR)

(72) Inventors: Kyoung-Ho Kim, Daejeon (KR); In-Sung Park, Daejeon (KR); In-Sook Jang, Daejeon (KR); Jin-Seok Yang, Daejeon (KR); Tae-Ghyoon Kim, Daejeon (KR); In-Jung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 221 days.

(21) Appl. No.: 15/791,759

(22) Filed: Oct. 24, 2017

(65) Prior Publication Data
US 2019/0019432 A1 Jan. 17, 2019

(30) Foreign Application Priority Data

Jul. 12, 2017 (KR) ........................ 10-2017-0088497

(51) Int. Cl.
*G09B 19/00* (2006.01)
*G09B 9/00* (2006.01)
*H04L 29/06* (2006.01)
*G06T 19/00* (2011.01)
*G06F 3/01* (2006.01)
*G09B 7/02* (2006.01)

(52) U.S. Cl.
CPC .......... *G09B 19/0053* (2013.01); *G06F 3/011* (2013.01); *G06T 19/006* (2013.01); *G09B 7/02* (2013.01); *G09B 9/00* (2013.01); *H04L 63/1441* (2013.01)

(58) Field of Classification Search
CPC ................................................. G09B 19/0053
USPC ......................................................... 434/366
See application file for complete search history.

(56) References Cited

FOREIGN PATENT DOCUMENTS

| KR | 10-2011-0068544 A | 6/2011 |
| KR | 10-1534192 B1 | 7/2015 |
| KR | 10-1709115 | 3/2017 |

*Primary Examiner* — Kesha Frisby
(74) *Attorney, Agent, or Firm* — LRK Patent Law Firm

(57) ABSTRACT

An apparatus and method for providing cyber-crisis response training based on augmented reality. The method for providing cyber-crisis response training based on augmented reality, performed by the apparatus for providing cyber-crisis response training based on augmented reality, includes setting a type of cyber-crisis response training, providing one or more trainee terminals with a cyber-crisis response training environment corresponding to the set type of cyber-crisis response training, receiving a response to the cyber-crisis response training environment from the trainee terminal, generating facility situation information based on state information of a target facility for which the cyber-crisis response training is being conducted and on training situation information corresponding to the cyber-crisis response training environment and the response, and outputting the facility situation information using an augmented-reality image corresponding to the target facility.

20 Claims, 6 Drawing Sheets

APPARATUS AND METHOD FOR CYBER-CRISIS RESPONSE TRAINING BASED ON AUGMENTED REALITY

CROSS REFERENCE TO RELATED APPLICATION

This application claims the benefit of Korean Patent Application No. 10-2017-0088497, filed Jul. 12, 2017, which is hereby incorporated by reference in its entirety into this application.

BACKGROUND OF THE INVENTION

1. Technical Field

The present invention relates generally to technology for providing cyber-crisis response training based on augmented reality, and more particularly to technology for outputting facility situation information in connection with cyber-crisis response training using augmented-reality technology.

2. Description of Related Art

Recently, with the development of information and communication technology and the propagation of information communication devices, cyberthreats to network-connected systems are increasing. Accordingly, training for responding to such cyberthreats is required.

Existing training for responding to cyberthreats is provided as a one-way lecture, and is conducted as teacher-directed learning that focuses on theory or as training based on a predetermined shared training scenario. Also, existing cybersecurity-related training aims at protecting general IT systems, such as PCs, web servers, DB servers, and the like, and an environment for training is provided by physically or virtually constructing the general IT systems to be protected. Representative damage from such cyberthreats is homepage defacement, service unavailable errors, and the like.

Recently, the increase of cyberthreats to national infrastructure for electricity, roads, nuclear power, railroads, and the like, has alerted people to the danger of cyberthreats to infrastructure. Accordingly, training for responding to cyberthreats in areas of physical facilities that need to be protected, such as national infrastructure, is required.

Existing training in a virtual environment is configured such that a single control device, such as a motor, a sensor or the like, is simply arranged and training therefor is conducted. Also, because training is conducted in order to respond to a single threat, it is difficult for trainees to capture the overall flow of the training.

Also, unlike general IT systems, control systems in national infrastructure control actual physical devices. Accordingly, in the event of a cyberattack, the failure of control of such physical devices may result in immense casualties. However, existing education and training methods have limitations as to the representation of the full extent of damage from cyberattacks on control systems.

Therefore, it is necessary to develop technology for providing a training environment for responding to a cyber-crisis occurring in an area in which physical facilities that need to be protected are present.

Documents of Related Art (Patent Document 1) Korean Patent No. 10-1534192, published on Jul. 8, 2015 and titled "System for providing cybersecurity real-time training against attacks and method thereof".

SUMMARY OF THE INVENTION

An object of the present invention is to provide a training environment for responding to a cyber-crisis in an area in which physical facilities that need to be protected are present.

Another object of the present invention is to provide a cyber-crisis response training environment in order to respond to a cyber-crisis that targets organizations, companies, countries and the like, which possess physical facilities that need to be protected.

A further object of the present invention is to secure systematic response capabilities in the event of a cyber-crisis.

Yet another object of the present invention is to improve trainees' immersion in training and maximize training performance by applying augmented-reality technology.

Still another object of the present invention is to provide a training system that operates in conjunction with a facility situation information output device in which a physical facility that needs to be protected is represented using augmented-reality technology and a physical device.

Still another object of the present invention is to increase capabilities for responding to a cyber-crisis in areas of national infrastructure, industrial control systems, and the like, and to thereby secure the cyber-crisis response capabilities of government and industry.

In order to accomplish the above objects, a method for providing cyber-crisis response training based on augmented reality, which is performed by an apparatus for providing cyber-crisis response training based on augmented reality, according to the present invention includes setting a type of cyber-crisis response training; providing one or more trainee terminals with a cyber-crisis response training environment corresponding to the set type of the cyber-crisis response training; receiving a response to the cyber-crisis response training environment from the trainee terminals; generating facility situation information based on state information of a target facility, for which the cyber-crisis response training is being conducted, and on training situation information corresponding to the cyber-crisis response training environment and the response; and outputting the facility situation information using an augmented-reality image corresponding to the target facility.

Here, generating the facility situation information may be configured to generate the training situation information by determining whether a training situation is a normal situation or an occurrence of an attack based on the cyber-crisis response training environment and the response from the trainee terminal.

Here, generating the facility situation information may be configured to generate the facility situation information of the target facility in connection with the cyber-crisis response training by applying the training situation information to the state information of the target facility.

Here, outputting the facility situation information may be configured to output the facility situation information using at least one of the trainee terminal, an output device, and a wearable display device worn by a trainee.

Here, outputting the facility situation information may be configured to output the augmented-reality image acquired by combining a virtual object corresponding to the facility situation information with an image corresponding to the target facility.

Here, outputting the facility situation information may include processing the image corresponding to the target facility, detecting at least one of a viewpoint and a position of the trainee, generating the virtual object corresponding to the target facility in consideration of at least one of the training situation information and the viewpoint and the position of the trainee, and generating the augmented-reality image by combining the generated virtual object with the image.

Here, setting the type of the cyber-crisis response training may be configured to select the target facility for which the cyber-crisis response training is to be conducted.

Here, outputting the facility situation information may be configured to output information about at least one of physical equipment and control equipment included in the target facility such that the information corresponds to the facility situation information.

Also, an apparatus for providing cyber-crisis response training based on augmented reality according to an embodiment of the present invention includes a training environment provision unit for providing one or more trainee terminals with a cyber-crisis response training environment corresponding to a type of cyber-crisis response training; a response input unit for receiving a response to the cyber-crisis response training environment from the trainee terminal; a facility situation information generation unit for generating facility situation information based on state information of a target facility, for which the cyber-crisis response training is being conducted, and on training situation information corresponding to the cyber-crisis response training environment and the response; and a facility situation information output unit for outputting the facility situation information using an augmented-reality image corresponding to the target facility.

Here, the facility situation information generation unit may generate the training situation information by determining whether a training situation is a normal situation or an occurrence of an attack based on the cyber-crisis response training environment and the response from the trainee terminal.

Here, the facility situation information generation unit may generate the facility situation information of the target facility in connection with the cyber-crisis response training by applying the training situation information to the state information of the target facility.

Here, the facility situation information output unit may output the facility situation information using at least one of the trainee terminal, an output device, and a wearable display device worn by a trainee.

Here, the facility situation information output unit may output the augmented-reality image acquired by combining a virtual object corresponding to the facility situation information with an image corresponding to the target facility.

Here, the facility situation information output unit may be configured to process the image corresponding to the target facility, to detect at least one of a viewpoint and a position of the trainee, to generate the virtual object corresponding to the target facility in consideration of at least one of the training situation information and the viewpoint and the position of the trainee, and to generate the augmented-reality image by combining the generated virtual object with the image.

Here, the apparatus may further include a training-type-setting unit for setting the type of the cyber-crisis response training by selecting the target facility, for which the cyber-crisis response training is to be conducted.

Here, the facility situation information output unit may output information about at least one of physical equipment and control equipment included in the target facility such that the information corresponds to the facility situation information.

Also, a system for providing cyber-crisis response training based on augmented reality according to an embodiment of the present invention includes one or more trainee terminals; an apparatus for providing cyber-crisis response training based on augmented reality, configured to provide a cyber-crisis response training environment to the trainee terminals, to receive a response to the cyber-crisis response training environment from the trainee terminals, and to generate facility situation information based on training situation information depending on the response and on state information of a target facility for which the cyber-crisis response training is being conducted; a first facility-situation information output device for outputting the facility situation information using an augmented-reality image corresponding to the target facility; and a second facility-situation information output device for outputting information about at least one of physical equipment and control equipment included in the target facility based on the facility situation information.

Here, the apparatus for providing cyber-crisis response training based on augmented reality may be configured to generate the training situation information by determining whether a training situation is a normal situation or an occurrence of an attack based on the cyber-crisis response training environment and the response from the trainee terminal, and to generate the facility situation information of the target facility in connection with the cyber-crisis response training by applying the training situation information to the state information of the target facility.

Here, the first facility-situation information output device may be a wearable display device worn by a trainee of the cyber-crisis response training.

Here, the augmented-reality image corresponding to the target facility may be a combination of an image corresponding to the target facility and a virtual object, generated in consideration of at least one of the training situation information, information about the target facility, and a viewpoint and a position of the trainee.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
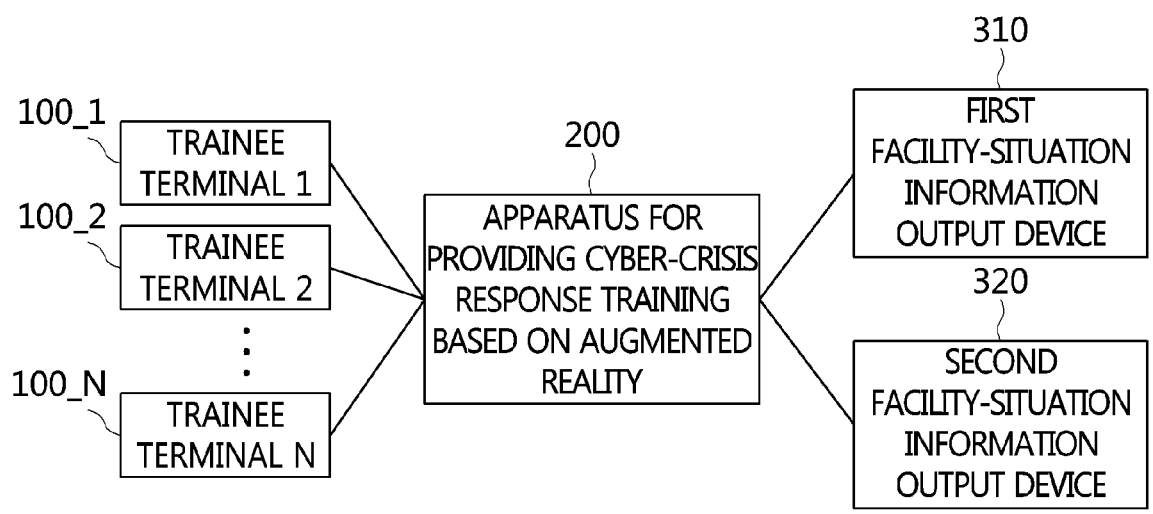
FIG. 1 is a view that schematically shows an environment in which an apparatus for providing cyber-crisis response training based on augmented reality according to an embodiment of the present invention is applied.

Because the present invention may be variously changed and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which an apparatus for providing cyber-crisis response training based on augmented reality according to an embodiment of the present invention is applied.

As illustrated in FIG. 1, a system for providing cyber-crisis response training based on augmented reality includes one or more trainee terminals 100, an apparatus 200 for providing cyber-crisis response training based on augmented reality, and one or more facility situation information output devices 310 and 320.

The trainee terminal 100 is a terminal that is used when a trainee accesses the apparatus 200 for providing cyber-crisis response training based on augmented reality. The apparatus 200 for providing cyber-crisis response training based on augmented reality provides a cyber-crisis response training environment to the one or more trainee terminals 100 and receives a response to the cyber-crisis response training environment from the trainee terminals 100.

Also, the apparatus 200 for providing cyber-crisis response training based on augmented reality generates facility situation information based on at least one of the state information of a target facility, for which cyber-crisis response training is to be conducted, and training situation information corresponding to the cyber-crisis response training environment and the trainee's response to the cyber-crisis response training environment.

Also, the apparatus 200 for providing cyber-crisis response training based on augmented reality outputs the facility situation information using at least one of the first facility-situation information output device 310 and the second facility-situation information output device 320.

The first facility-situation information output device 310 is a device for outputting facility situation information using an augmented-reality image corresponding to the target facility. The second facility-situation information output device 320 is a device for outputting information about at least one of physical equipment and control equipment included in the target facility.

Augmented-reality technology, which has rapidly developed in recent years thanks to the performance improvement of hardware and software, is technology for augmenting the sense of reality by superimposing a virtual object on an image of the real world, captured using a camera, based on specific information. The virtual object may be an object generated through 3D modeling or an object represented by adding specific information thereto.

Here, the specific information may be extracted using a marker-based method, through which information is extracted from an image using a specific form of a marker that is attached to the image, or a marker-less method, through which information is extracted without the use of a marker, but the augmented-reality techniques applied to the system for providing cyber-crisis response training based on augmented reality are not limited thereto.

The apparatus 200 for providing cyber-crisis response training based on augmented reality according to an embodiment of the present invention may more effectively represent physical facilities that need to be protected (physical equipment, control equipment, and the like) and damage thereto using the first facility-situation information output device 310, whereby vivid and realistic cyber-crisis response training may be provided to trainees.

Hereinafter, the configuration of an apparatus for providing cyber-crisis response training based on augmented reality according to an embodiment of the present invention will be described in detail with reference to FIG. 2.

Figure 2:
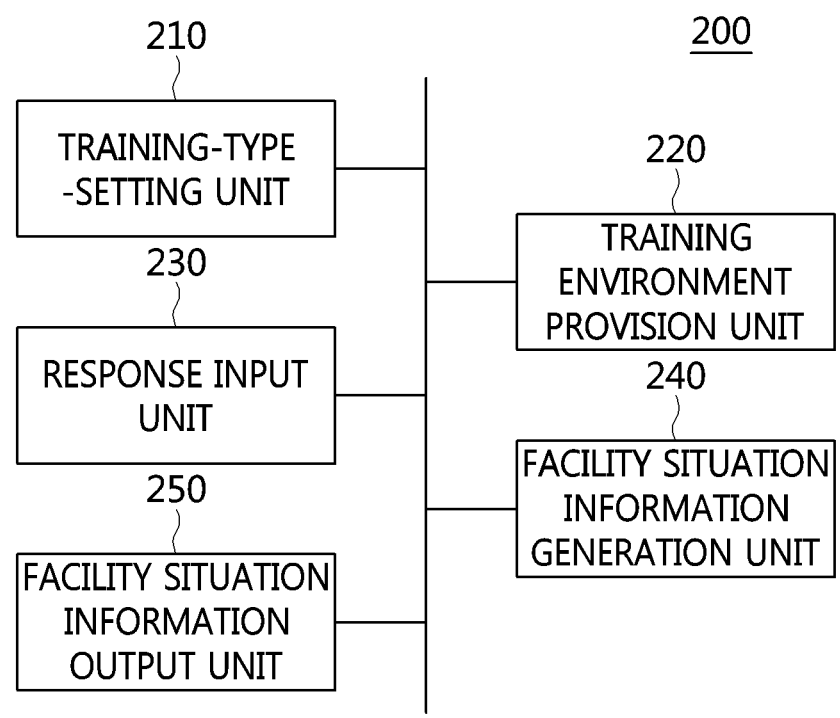
FIG. 2 is a block diagram that shows the configuration of an apparatus for providing cyber-crisis response training based on augmented reality according to an embodiment of the present invention.

FIG. 2 is a block diagram that shows the configuration of an apparatus for providing cyber-crisis response training based on augmented reality according to an embodiment of the present invention.

As illustrated in FIG. 2, the apparatus 200 for providing cyber-crisis response training based on augmented reality includes a training-type-setting unit 210, a training environment provision unit 220, a response input unit 230, a facility situation information generation unit 240, and a facility situation information output unit 250.

First, the training-type-setting unit 210 sets the type of cyber-crisis response training. Here, setting the type of cyber-crisis response training may mean selecting a target facility for which the cyber-crisis response training is to be conducted.

When the cyber-crisis response training starts, the training-type-setting unit 210 may set the type of cyber-crisis response training for trainees. Here, the training-type-setting unit 210 may divide trainees into groups and set the type of cyber-crisis response training for each of the groups. For example, group A may be set so as to conduct cyber-crisis response training in the power generation field, and group B may be set so as to conduct cyber-crisis response training in the maritime field.

The training environment provision unit 220 provides one or more trainee terminals with a cyber-crisis response training environment corresponding to the type of the cyber-crisis response training.

The trainee takes action, such as the detection of cyberattacks, initial response to the cyberattacks, or the like, in the provided cyber-crisis response training environment. Accordingly, the response input unit 230 receives the response to the cyber-crisis response training environment from the terminal of the trainee.

The facility situation information generation unit 240 generates facility situation information based on the state information of the target facility, for which cyber-crisis response training is being conducted, and on training situation information corresponding to the cyber-crisis response training environment and the response of the trainee.

Here, based on the cyber-crisis response training environment and the response of the trainee, the facility situation information generation unit 240 determines whether a training situation is a normal situation or the occurrence of an attack, and may generate training situation information based thereon.

Also, the facility situation information generation unit 240 may generate the facility situation information of the target facility in connection with the cyber-crisis response training by applying the training situation information to the state information of the target facility.

The facility situation information output unit 250 outputs the facility situation information using an augmented-reality image corresponding to the target facility. Here, the facility situation information output unit 250 may output the facility situation information using at least one of the trainee terminal, the first facility-situation information output device, and the second facility-situation information output device.

The facility status information output unit 250 may generate and output an augmented-reality image acquired by combining a virtual object corresponding to the facility situation information with the image of the target facility, or may send the augmented-reality image to the first facility-situation information output device.

Also, the facility situation information output unit 250 may output information about at least one of physical equipment and control equipment included in the target facility such that the information matches the facility situation information, or may send the information to the second facility-situation information output device.

The facility situation information output unit 250 may process the image of the target facility, detect at least one of the viewpoint and the position of the trainee, and generate a virtual object corresponding to the target facility in consideration of at least one of the training situation information and the viewpoint and position of the trainee. Also, the facility situation information output unit 250 may generate an augmented-reality image by combining the generated virtual object with the image of the target facility.

Hereinafter, a method for providing cyber-crisis response training performed by an apparatus for providing cyber-crisis response training based on augmented reality according to an embodiment of the present invention will be described in detail with reference to FIG. 3 and FIG. 4.

Figure 3:
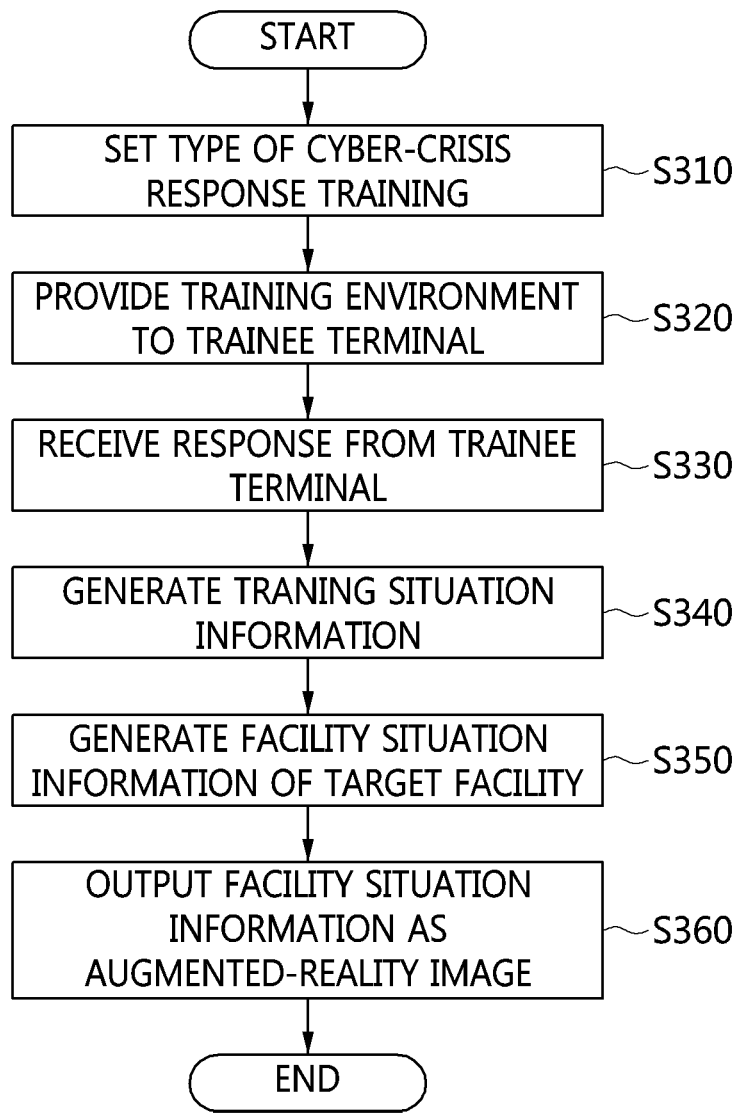
FIG. 3 is a flowchart for explaining a method for providing cyber-crisis response training based on augmented reality according to an embodiment of the present invention.

FIG. 3 is a flowchart for explaining a method for providing cyber-crisis response training based on augmented reality according to an embodiment of the present invention.

First, the apparatus 200 for providing cyber-crisis response training based on augmented reality sets the type of cyber-crisis response training at step S310.

The apparatus 200 for providing cyber-crisis response training based on augmented reality sets the type of cyber-crisis response training to be provided to a trainee terminal. Here, the type of cyber-crisis response training may mean the type of target facility for which the cyber-crisis response training is to be conducted. The target facility for which the cyber-crisis response training is to be conducted may be national infrastructure, such as power plants, road facilities, railway facilities, marine facilities, nuclear power facilities, water supply and sewage facilities, and the like, but the target facility is not limited to these examples.

Then, the apparatus 200 for providing cyber-crisis response training based on augmented reality provides a training environment to the trainee terminal at step S320.

The apparatus 200 for providing cyber-crisis response training based on augmented reality provides the trainee terminal with a training environment corresponding to the type of cyber-crisis response training, which was set at step S310.

If the cyber-crisis response training is of a type related to the power sector, the apparatus 200 for providing cyber-crisis response training based on augmented reality provides a cyber-crisis response training environment for a target facility in the power generation field. On the other hand, if the cyber-crisis response training is of a type related to the maritime sector, the apparatus 200 for providing cyber-crisis response training based on augmented reality may provide a cyber-crisis response training environment for a target facility in the maritime field to the trainee terminal.

The apparatus 200 for providing cyber-crisis response training based on augmented reality receives a response to the cyber-crisis response training environment from the trainee terminal at step S330 and generates training situation information corresponding to the response at step S340.

The apparatus 200 for providing cyber-crisis response training based on augmented reality receives the response to the cyber-crisis response training environment from the trainee terminal that was provided with the cyber-crisis response training environment. Here, the response may be the detection of a cyberattack, initial action taken in response thereto, and the like, input by the trainee.

Then, the apparatus 200 for providing cyber-crisis response training based on augmented reality generates training situation information based on the received response. Based on the cyber-crisis response training environment provided to the trainee terminal and the response input from the trainee terminal, the apparatus 200 for providing cyber-crisis response training based on augmented reality determines whether the current training situation is a normal situation or the occurrence of an attack.

Also, the apparatus 200 for providing cyber-crisis response training based on augmented reality may generate training situation information based on the determination of whether the current training situations represent a normal situation or the occurrence of an attack.

Then, the apparatus 200 for providing cyber-crisis response training based on augmented reality generates facility situation information of the target facility at step S350.

The apparatus 200 for providing cyber-crisis response training based on augmented reality may generate the facility situation information of the target facility based on the cyber-crisis response training environment provided to the trainee terminal, the training situation information generated at step S340, and the state information of the target facility for which the cyber-crisis response training is being conducted.

The apparatus 200 for providing cyber-crisis response training based on augmented reality may provide a cyber-crisis response training environment for national infrastructure, industrial control systems, or the like, in which a physical facility that needs to be protected (referred to herein as the "target facility") is present. Also, the target facility may include physical equipment, such as motors, pumps, and the like, control equipment for controlling the physical equipment, such as a programmable logic controller (PLC) or the like, and information system equipment for digitally controlling the control equipment and recording various kinds of monitoring information.

For example, assume that the cyber-crisis response training environment pertains to the power sector, that the training situation information corresponds to the occurrence of an attack, and that the target facility includes a PLC, Remote Terminal Units (RTU), and a Front End Processor (FEP). Here, the apparatus 200 for providing cyber-crisis response training based on augmented reality may generate the facility situation information of the target facility in connection with the cyber-crisis response training by applying the training situation information corresponding to the occurrence of an attack to the target facility including the PLC, the RTU and the FEP.

Finally, the apparatus 200 for providing cyber-crisis response training based on augmented reality outputs the facility situation information as an augmented-reality image at step S360.

The apparatus 200 for providing cyber-crisis response training based on augmented reality may provide the trainee with a training environment that is similar to the target facility for which the cyber-crisis response training is being conducted based on one or more virtual machines in which a guest operating system (OS) is installed and on a virtual network.

The apparatus 200 for providing cyber-crisis response training based on augmented reality may represent the target facility using a physical device and augmented-reality technology in order to maximize the sense of reality of the cyber-crisis response training and the efficiency thereof.

Figure 4:
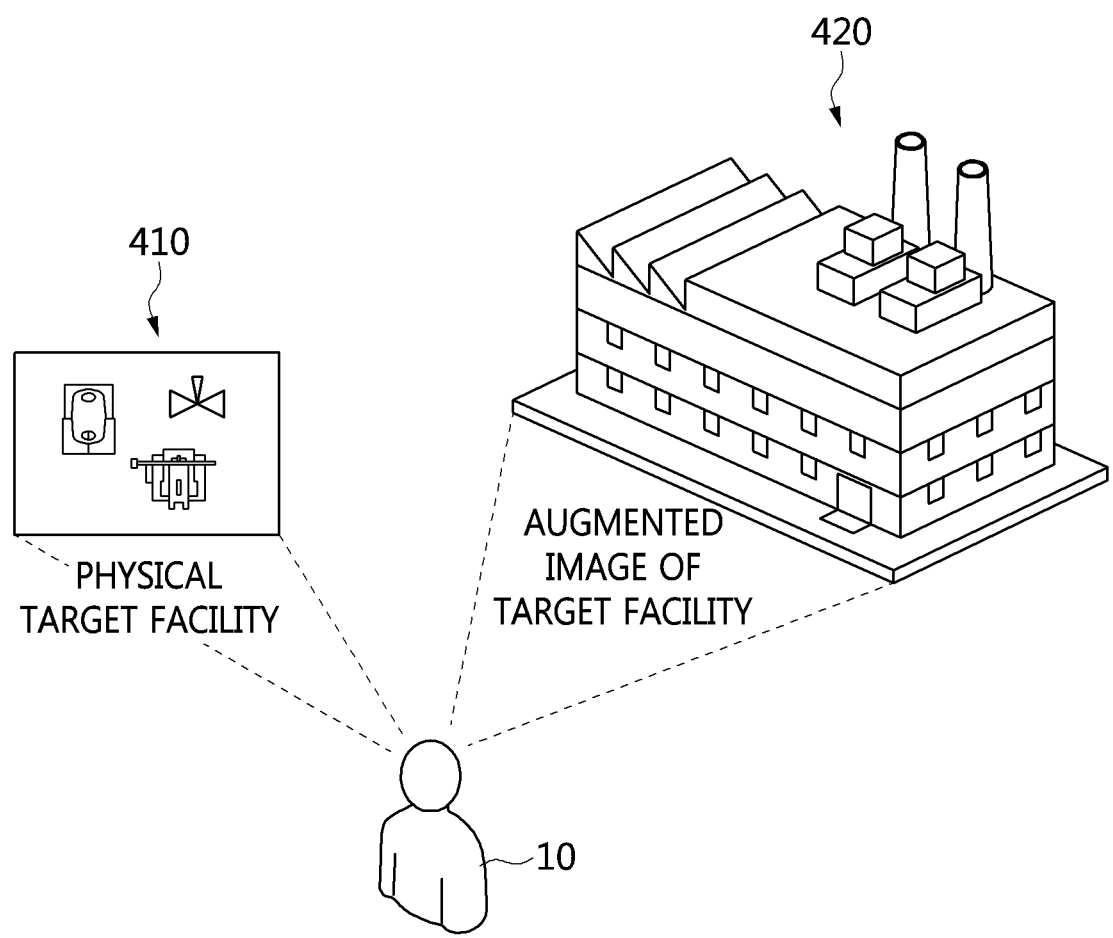
FIG. 4 is an exemplary view that shows the method for outputting facility situation information at step S360 of FIG. 3.

FIG. 4 is an exemplary view that shows the method of outputting facility situation information at step S360 of FIG. 3.

As illustrated in FIG. 4, the apparatus 200 for providing cyber-crisis response training based on augmented reality may provide a trainee 10 with a representation of a physical target facility 410 and an augmented image of a target facility 420.

The method of displaying the physical target facility 410 is to represent the target facility by conceptualizing a target area or a target process. Also, the equipment in the target facility may be represented by actually manufacturing a miniature thereof, or for a sense of reality, miniaturized equipment may be represented so as to match the operation logic of the actual equipment in the target facility.

The apparatus 200 for providing cyber-crisis response training based on augmented reality may receive the state information of the target facility via a training system connection interface, and may share the facility situation information depending on the progress of the training.

However, in the method of displaying the physical target facility 410 using a physical device, the target facility is represented as a miniaturized and simplified form thereof due to various limitations, such as a spatial limitation and the like, which deteriorates the immersive nature of cyber-crisis response training. However, the implementation of an actual environment for the increase of immersion in training is impossible in practice due to high expenses.

In order to solve this problem, the apparatus 200 for providing cyber-crisis response training based on augmented reality may output an augmented image of the target facility 420 using augmented-reality technology. Accordingly, the apparatus 200 for providing cyber-crisis response training based on augmented reality enables trainees to experience a target facility having a shape and a size that are similar to those of the actual target facility, thereby maximizing the effect of the cyber-crisis response training.

In particular, the apparatus 200 for providing cyber-crisis response training based on augmented reality may display the facility situation information of the cyber-crisis response training by combining the method of displaying the physical target facility 410 using a physical device with the method of displaying an augmented image of the target facility 420 using augmented-reality technology.

Hereinafter, the system for providing cyber-crisis response training based on augmented reality according to an embodiment of the present invention will be described in detail with reference to FIG. 5.

Figure 5:
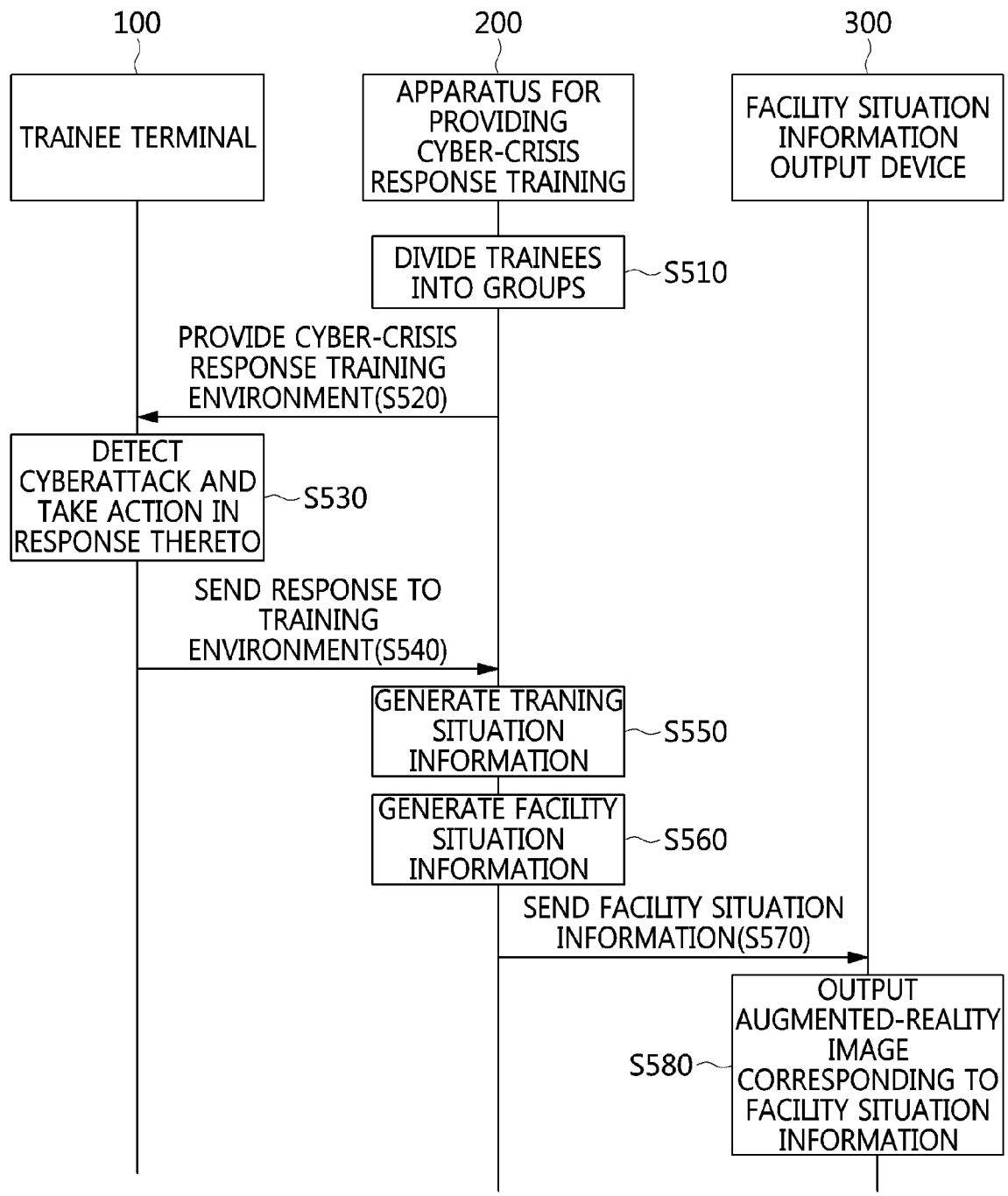
FIG. 5 is a flowchart that shows the operation of a system for providing cyber-crisis response training based on augmented reality according to an embodiment of the present invention.

FIG. 5 is a flowchart that shows the operation of the system for providing cyber-crisis response training based on augmented reality according to an embodiment of the present invention.

First, the apparatus 200 for providing cyber-crisis response training divides trainees into groups at step S510.

Here, the process of dividing the trainees into groups may be at least one of the process of setting the type of cyber-crisis response training and the process of selecting a target facility for which the cyber-crisis response training is to be conducted. Also, the process of dividing the trainees into groups may be effectively the same as that of step 310 of FIG. 3, and a repeated description will be omitted.

Then, the apparatus 200 for providing cyber-crisis response training provides a cyber-crisis response training environment to one or more trainee terminals 100 at step S520. Here, because the process of providing the cyber-crisis response training environment is effectively the same as that of step S320 of FIG. 3, a repeated description will be omitted.

The trainee terminal 100 that is provided with the cyber-crisis response training environment displays the cyber-crisis response training environment to the trainee and receives a response, such as the detection of a cyberattack, a reaction thereto, or the like, at step S530.

Also, the trainee terminal 100, having received the response from the trainee, sends the response to the training environment to the apparatus 200 for providing cyber-crisis response training at step S540. Because the process in which the apparatus 200 for providing cyber-crisis response training receives the response from the trainee terminal 100 is effectively the same as that of step S330 of FIG. 3, a repeated description will be omitted.

The apparatus 200 for providing cyber-crisis response training generates training situation information at step S550, generates facility situation information based on the training situation information at step S560, and sends the facility situation information to one or more facility situation information output devices 300 at step S570.

The facility situation information output device 300 may be a facility situation information output device for displaying an augmented image of the target facility using augmented-reality technology, and may further include a facility situation information output device for displaying a physical target facility.

Also, the apparatus 200 for providing cyber-crisis response training may generate training situation information by determining a training situation based on the training environment and the trainee's response thereto. Also, the apparatus 200 for providing cyber-crisis response training may generate facility situation information of the target facility in connection with the cyber-crisis response training by applying the training situation information to the state information of the target facility.

Here, because the processes of generating training situation information, generating facility situation information, and sending the facility situation information to the facility situation information output device 300 are effectively the same as those of steps S340 and S350 of FIG. 3, a repeated description thereof will be omitted.

Then, the facility situation information output device 300 displays an augmented-reality image corresponding to the facility situation information at step S580.

At least one of the facility situation information output device for displaying an augmented image of the target facility (which is the first facility-situation information output device) and the facility situation information output device for displaying a physical target facility (which is the second facility-situation information output device) outputs the received facility situation information.

Figure 6:
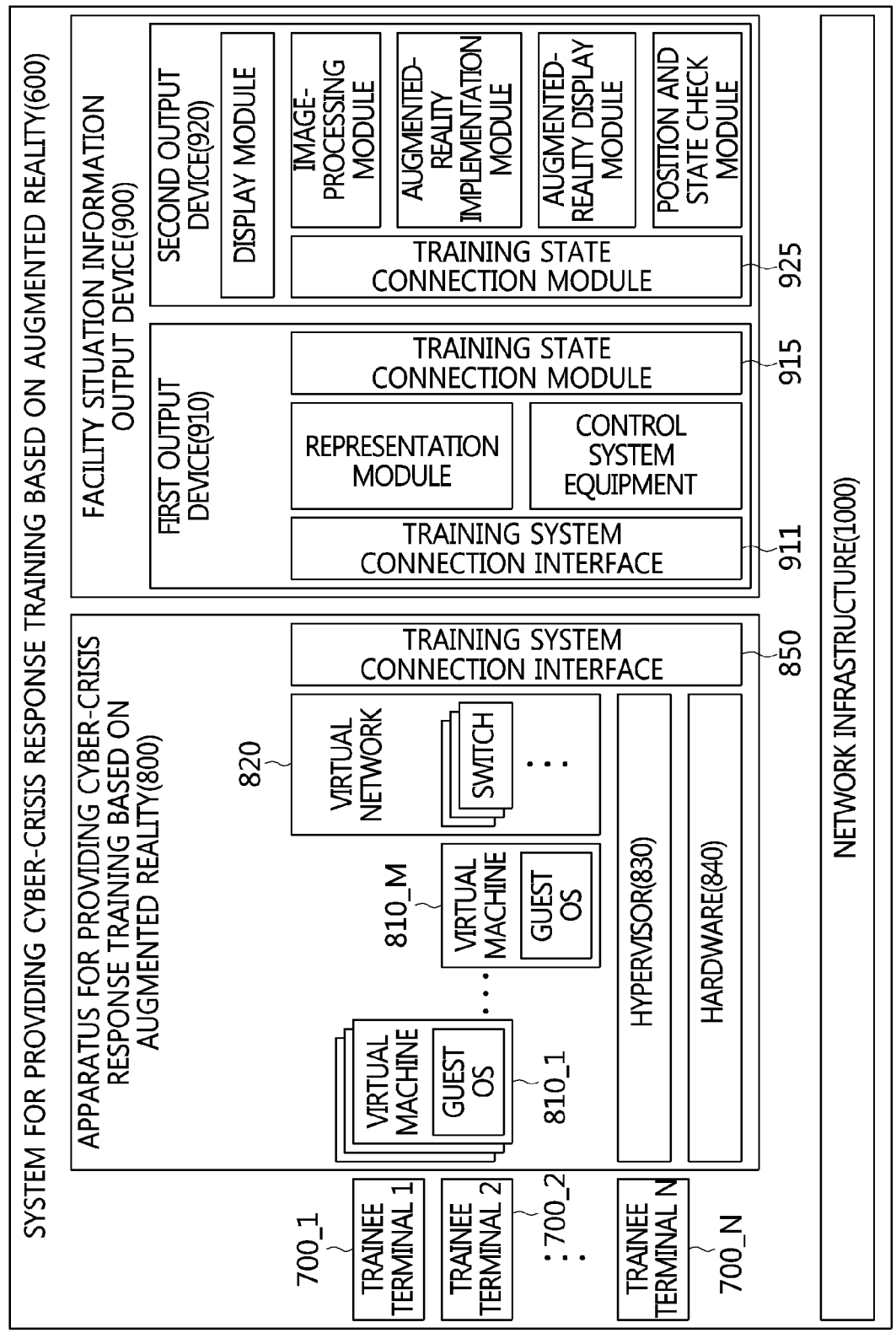
FIG. 6 is an exemplary view that shows the configuration of a system for providing cyber-crisis response training based on augmented reality according to another embodiment of the present invention.

FIG. 6 is an exemplary view that shows the configuration of a system for providing cyber-crisis response training based on augmented reality according to another embodiment of the present invention.

As illustrated in FIG. 6, the system 600 for providing cyber-crisis response training based on augmented reality includes one or more of trainee terminals 700, an apparatus 800 for providing cyber-crisis response training based on augmented reality, a facility situation information output device 900, and network infrastructure 1000.

The apparatus 800 for providing cyber-crisis response training based on augmented reality provides a cyber-crisis response training environment to the one or more trainee terminals 700. The apparatus 800 for providing cyber-crisis response training based on augmented reality may provide the trainee terminals 700 with a training environment that is similar to the target facility for which the cyber-crisis response training is being conducted based on one or more virtual machines 810 in which a guest OS is installed and a virtual network 820.

The virtual machines 810 mean system virtual machines, such as various PCs, servers, or the like, used for the cyber-crisis response training, and operate depending on various roles assigned thereto based on the type of the cyber-crisis response training or the target facility (target area). The virtual network 820 may configure a network by simulating the actual environment, including physical switches.

The apparatus 800 for providing cyber-crisis response training based on augmented reality may provide a training environment that is similar to information system equipment for controlling control equipment and recording various kinds of monitoring information. Also, the apparatus 800 for providing cyber-crisis response training based on augmented reality may virtually provide various PCs, servers, and networks, which are used for the control of control equipment.

The apparatus 800 for providing cyber-crisis response training based on augmented reality distributes resources based on actually configured physical hardware 840 through a hypervisor 830, whereby various systems may be virtually provided.

Also, the apparatus 800 for providing cyber-crisis response training based on augmented reality may share the state information of the target facility and facility situation information depending on the progress of the training with the facility situation information output device 900 via the training system connection interface 850 and the training system connection interface 911 of the facility situation information output device 900.

The training system connection interface 850 sends the first output device 910 training situation information depending on the trainee's response, and may thereby enable a representation module and control system equipment to perform operation corresponding to the training situation information. Also, the training system connection interface 850 delivers the training situation information to the second output device 920 worn by the trainee, whereby the training situation information may be used as basic data for an augmented-reality image for representing a normal situation and the occurrence of an attack.

The facility situation information output device 900 may include one or more output devices 910 and 920. The first output device 910 may receive facility situation information from the apparatus 800 for providing cyber-crisis response training based on augmented reality via the training system connection interface 911, and may output the facility situation information.

The representation module of the first output device 910 may represent the target area by simplifying it using a conceptual diagram, a process chart, and the like, and may represent control system equipment by miniaturizing actual control equipment. Here, in order to enable the change of the control state of the control system equipment to have an effect on the representation module, the representation module may operate in conjunction with the control system equipment.

Also, the first output device 910 may output facility situation information such that the target facility is represented as an augmented image thereof using augmented-reality technology. Also, the first output device 910 may output the facility situation information such that the physical target facility is represented using a physical device. Here, the first output device 910 may output facility situation information under a normal situation or in the event of an attack (damage) based on the training situation information.

The first output device 910 may send the facility situation information, information about an augmented object, and the like to the training state connection module 925 of the second output device 920 via the training state connection module 915. Here, the second output device 920 may be a wearable display device worn by a trainee, which enables the trainee to check the augmented object and to respond to the cyber-crisis response training environment.

The second output device 920 may be a wearable display device in the form of glasses or a helmet, or may be a terminal carried by a trainee or a fixed device. The second output device 920 includes a display module, an image-processing module, an augmented-reality implementation module, an augmented-reality display module, and a position and state check module, and may receive facility situation information from the first output device 910 via the training state connection module.

The display module provides trainees with the environment surrounding the target facility and the augmented virtual object by displaying them. The display module may display the environment surrounding the target facility and the augmented virtual object in a normal situation or in the event of an attack (damage) such that the displayed information corresponds to the training situation information.

The image-processing module recognizes the surrounding environment by processing images, the position and state check module detects the viewpoint and the position of a trainee, the augmented-reality implementation module constructs a virtual object based on the detected data, and the augmented-reality display module represents the constructed virtual object using the display module.

For the convenience of description, the first output device 910 is described as communicating with the apparatus 800 for providing cyber-crisis response training based on augmented reality via the training system connection interface 911 and as sharing the facility situation information with the second output device 920 using the training state connection module 915, but without limitation thereto, the second output device 920 may directly communicate with the apparatus 800 for providing cyber-crisis response training based on augmented reality, and may share the state information of the target facility and the facility situation information in connection with the progress of the training.

Also, for the convenience of description, facility situation information output devices are referred to as the first output device 910 and the second output device 920, but the first output device 910 and the output display device 920 do not necessarily indicate the first facility-situation information output device 310 and the second facility-situation information output device 320 in FIG. 1, respectively.

As described above, the apparatus 800 for providing cyber-crisis response training based on augmented reality according to an embodiment of the present invention enables trainees to realistically practice cyber-crisis response training by operating in conjunction with the facility situation information output device 900 for representing a physical facility that needs to be protected.

Existing training for responding to cyberthreats handles cyberthreats only to general IT systems, but may not appropriately represent cyberthreats to areas in which physical facilities that need to be protected are present. However, the system 600 for providing cyber-crisis response training based on augmented reality according to an embodiment of the present invention enables cyber-crisis response training in areas in which physical facilities that need to be protected are present by applying augmented-reality technology, and may improve trainees' immersion in training and maximize the training performance by applying augmented-reality technology.

According to the present invention, a training environment may be provided in order to respond to a cyber-crisis in an area in which physical facilities that need to be protected are present.

Also, according to the present invention, a cyber-crisis response training environment may be provided in order to respond to a cyber-crisis that targets organizations, companies, countries, and the like, which possess physical facilities that need to be protected.

Also, according to the present invention, systematic response capabilities may be secured in the event of a cyber-crisis.

Also, according to the present invention, trainees' immersion in training may be improved and training performance may be maximized by applying augmented-reality technology.

Also, according to the present invention, there may be provided a training system that operates in conjunction with a facility situation information output device in which a physical facility that needs to be protected is represented using augmented-reality technology and a physical device.

Also, according to the present invention, capabilities for responding to a cyber-crisis in areas of national infrastructure, industrial control systems, and the like are increased, whereby the cyber-crisis response capabilities of government and industry may be secured.

As described above, the apparatus and method for providing cyber-crisis response training based on augmented reality according to the present invention are not limitedly applied to the configurations and operations of the above-described embodiments, but all or some of the embodiments may be selectively combined and configured, so that the embodiments may be modified in various ways.

What is claimed is:

1. A method for providing cyber-crisis response training based on augmented reality, which is performed by an apparatus for providing cyber-crisis response training based on augmented reality, the method comprising:
   setting a type of cyber-crisis response training;
   providing one or more trainee terminals with a cyber-crisis response training environment corresponding to the set type of the cyber-crisis response training;
   receiving a response to the cyber-crisis response training environment from the trainee terminal;
   generating facility situation information based on state information of a target facility, for which the cyber-crisis response training is being conducted, and on training situation information corresponding to the cyber-crisis response training environment and the response, and generating an augmented-reality image corresponding to the target facility based on the facility situation information; and
   outputting the facility situation information for display on said one or more trainee terminals using the augmented-reality image corresponding to the target facility.

2. The method of claim 1, wherein generating the facility situation information is configured to generate the training situation information by determining whether a training situation is a normal situation or an occurrence of an attack based on the cyber-crisis response training environment and the response from the trainee terminal.

3. The method of claim 2, wherein generating the facility situation information is configured to generate the facility situation information of the target facility in connection with the cyber-crisis response training by applying the training situation information to the state information of the target facility.

4. The method of claim 1, wherein outputting the facility situation information is configured to output the facility situation information using at least one of the trainee terminal, an output device, and a wearable display device worn by a trainee.

5. The method of claim 4, wherein outputting the facility situation information is configured to output the augmented-reality image acquired by combining a virtual object corresponding to the facility situation information with an image corresponding to the target facility.

6. The method of claim 5, wherein outputting the facility situation information comprises:
processing the image corresponding to the target facility;
detecting at least one of a viewpoint and a position of the trainee;
generating the virtual object corresponding to the target facility in consideration of at least one of the training situation information and the viewpoint and the position of the trainee; and
generating the augmented-reality image by combining the generated virtual object with the image.

7. The method of claim 1, wherein setting the type of the cyber-crisis response training is configured to select the target facility for which the cyber-crisis response training is to be conducted.

8. The method of claim 1, wherein outputting the facility situation information is configured to output information about at least one of physical equipment and control equipment included in the target facility such that the information corresponds to the facility situation information.

9. An apparatus for providing cyber-crisis response training based on augmented reality, the apparatus comprising:
a server comprising one or more units, executed by a processor, the one or more units comprising:
a training environment provision unit for providing one or more trainee terminals with a cyber-crisis response training environment corresponding to a type of cyber-crisis response training;
a response input unit for receiving a response to the cyber-crisis response training environment from the trainee terminal;
a facility situation information generation unit for generating facility situation information based on state information of a target facility, for which the cyber-crisis response training is being conducted, and on training situation information corresponding to the cyber-crisis response training environment and the response, and generating an augmented-reality image corresponding to the target facility based on the facility situation information; and
a facility situation information output unit for outputting the facility situation information for display on said one or more trainee terminals using the augmented-reality image corresponding to the target facility.

10. The apparatus of claim 9, wherein the facility situation information generation unit generates the training situation information by determining whether a training situation is a normal situation or an occurrence of an attack based on the cyber-crisis response training environment and the response from the trainee terminal.

11. The apparatus of claim 10, wherein the facility situation information generation unit generates the facility situation information of the target facility in connection with the cyber-crisis response training by applying the training situation information to the state information of the target facility.

12. The apparatus of claim 9, wherein the facility situation information output unit outputs the facility situation information using at least one of the trainee terminal, an output device, and a wearable display device worn by a trainee.

13. The apparatus of claim 12, wherein the facility situation information output unit outputs the augmented-reality image acquired by combining a virtual object corresponding to the facility situation information with an image corresponding to the target facility.

14. The apparatus of claim 13, wherein the facility situation information output unit is configured to:
process the image corresponding to the target facility;
detect at least one of a viewpoint and a position of the trainee;
generate the virtual object corresponding to the target facility in consideration of at least one of the training situation information and the viewpoint and the position of the trainee; and
generate the augmented-reality image by combining the generated virtual object with the image.

15. The apparatus of claim 9, further comprising:
a training-type-setting unit for setting the type of the cyber-crisis response training by selecting the target facility, for which the cyber-crisis response training is to be conducted.

16. The apparatus of claim 9, wherein the facility situation information output unit outputs information about at least one of physical equipment and control equipment included in the target facility such that the information corresponds to the facility situation information.

17. A system for providing cyber-crisis response training based on augmented reality, the system comprising:
one or more trainee terminals;
an apparatus for providing cyber-crisis response training based on augmented reality, configured to provide a cyber-crisis response training environment to the trainee terminals, to receive a response to the cyber-crisis response training environment from the trainee terminals, and to generate facility situation information based on training situation information depending on the response and on state information of a target facility for which the cyber-crisis response training is being conducted, and generating an augmented-reality image corresponding to the target facility based on the facility situation information;
a first facility-situation information output device for outputting the facility situation information for display on said one or more trainee terminals using the augmented-reality image corresponding to the target facility; and
a second facility-situation information output device for outputting information about at least one of physical equipment and control equipment included in the target facility based on the facility situation information.

18. The system of claim 17, wherein the apparatus for providing cyber-crisis response training based on augmented reality is configured to:
generate the training situation information by determining whether a training situation is a normal situation or an occurrence of an attack based on the cyber-crisis response training environment and the response from the trainee terminal; and
generate the facility situation information of the target facility in connection with the cyber-crisis response training by applying the training situation information to the state information of the target facility.

19. The system of claim 18, wherein the first facility-situation information output device is a wearable display device worn by a trainee of the cyber-crisis response training.

20. The system of claim 19, wherein the augmented-reality image corresponding to the target facility is a combination of an image corresponding to the target facility and a virtual object, generated in consideration of at least one of the training situation information, information about the target facility, and a viewpoint and a position of the trainee.

\* \* \* \* \*